(12) United States Patent
Schwalm et al.

(10) Patent No.: US 6,177,535 B1
(45) Date of Patent: Jan. 23, 2001

(54) PREPARING RADIATION-CURABLE, URETHANE-FUNCTIONAL PREPOLYMERS

(75) Inventors: Reinhold Schwalm, Wachenheim; Rainer Königer, Ludwigshafen; Wolfgang Paulus, Mainz; Wolfgang Reich, Maxdorf; Erich Beck, Ladenburg; Matthias Lokai, Enkenbach-Alsenborn; Klaus Menzel, Ludwigshafen, all of (DE)

(73) Assignee: BASF Aktiengesellchaft, Ludwigshafen (DE)

( * ) Notice: Under 35 U.S.C. 154(b), the term of this patent shall be extended for 0 days.

(21) Appl. No.: 09/157,615

(22) Filed: Sep. 21, 1998

(30) Foreign Application Priority Data

Sep. 22, 1997 (DE) ............................................... 197 41 781
Apr. 2, 1998 (DE) ............................................... 198 14 874

(51) Int. Cl.[7] ..................................................... C08G 18/08
(52) U.S. Cl. .......................... 528/49; 427/385.5; 522/90; 522/174; 528/59; 528/67; 528/75; 528/90; 528/174; 560/330; 560/335; 560/355
(58) Field of Search ..................................... 560/330, 335, 560/355; 427/385.5; 528/59, 75, 49, 67; 522/90, 174

(56) References Cited

U.S. PATENT DOCUMENTS 5,137,972  8/1992  Cook .
5,322,861  6/1994  Tsuge et al. .

FOREIGN PATENT DOCUMENTS

WO 94/12554  6/1994  (WO) .

OTHER PUBLICATIONS

Database WPI, Derwent Publications, DE–4404616, Aug. 17, 1995.

Primary Examiner—John M. Cooney, Jr.
(74) Attorney, Agent, or Firm—Oblon, Spivak, McClelland, Maier & Neustadt, P.C.

(57) ABSTRACT

A process for preparing radiation-curable, urethane-functional prepolymers by reacting an isocyanate-functional component A with an OH-containing component B, wherein either component A embraces two different isocyanate compounds A1 or one isocyanate compound A1 and at least one isocyanate compound A2 or component B embraces at least two different compounds B1. Also, the prepolymers obtainable by the process and the radiation-curable formulations comprising them. Furthermore, the use of the radiation-curable formulations for coating substrates, a method of coating substrates, and the coated substrates themselves.

11 Claims, No Drawings

PREPARING RADIATION-CURABLE, URETHANE-FUNCTIONAL PREPOLYMERS

Preparing radiation-curable, urethane-functional prepolymers

The present invention relates to a process for preparing radiation-curable, urethane-functional prepolymers, in which an isocyanate-functional component A is reacted with an OH-containing component B. The present invention also relates to the radiation-curable, urethane-functional prepolymers obtainable by this process.

Radiation-curable, urethane-functional prepolymers are employed widely in the art, examples of their applications as photoresists and as components in high-grade coating materials. They generally include at least two ethylenically unsaturated double bonds per molecule, which polymerize under the action of high-energy radiation, such as UV light or electron beams, and so form a network of high molecular mass. Coatings based on radiation-curable, urethane-functional prepolymers generally feature high mechanical and chemical resistance.

An overview of ethylenically unsaturated, urethane-functional prepolymers is given, for example, in P. K. T. Oldring (ed.), Chemistry and Technology of UV- and EB-Formulations for Coatings, Inks and Paints, Vol. II, SITA Technology, London, 1991, pp. 73–123.

DE-A-4 007 146 discloses, for example, urethane acrylate compounds which are obtainable by reacting polyisocyanates with hydroxyalkyl acrylates and then reacting the products with primary or secondary amines. The coatings obtainable using these compounds are notable for high elasticity and high surface hardness. The reaction of isocyanates with polyols and hydroxy-alkyl acrylates is described, for example, in DE 2726041 A, U.S. Pat. No. 4,260,703 and U.S. Pat. No. 4,481,093 and the reaction of isocyanates with hydroxyalkyl acrylates in JP 63297369 and JP 59157112.

The urethane acrylates of the prior art are often problematic in terms of their stability on storage. Especially when stored at low temperatures, they agglomerate and become cloudy. This problem can be remedied in principle by diluting the urethane acrylates with appropriate solvents. Inert solvents, however, must generally be removed before curing. This additional operation is undesirable on the ground not least of cost. Dilution with reactive diluents—by which are meant ethylenically unsaturated compounds of low molecular mass which polymerize on curing with the ethylenically unsaturated prepolymers and so are incorporated into the coating—is naturally limited by the desired profile of properties of the coatings. In general, even formulations comprising urethane-functional prepolymers and reactive diluents turn cloudy after just a few days.

It is an object of the present invention to provide radiation-curable, urethane-functional prepolymers having improved stability on storage. Moreover, coatings based on such prepolymers should possess little propensity to yellowing, a high level of hardness and a fairly high flexibility.

We have found that this object is achieved, and that urethane-functional prepolymers having the desired profile of properties are obtained, if an isocyanate-functional component A, which comprises at least one trifunctional isocyanate A1 with or without a difunctional isocyanate A2, is reacted with an OH-containing component B, which comprises at least one ethylenically unsaturated, OH-containing compound.

The present invention accordingly provides a process for preparing radiation-curable, urethane-functional prepolymers by reacting an isocyanate-functional component A with an OH-containing component B, wherein the component A comprises at least one trifunctional isocyanate compound A1 with or without one or more difunctional isocyanate compounds A2 and the OH-containing component B comprises at least one ethylenically unsaturated compound B1 having at least one reactive OH group with or without different OH-containing compounds B2, where either component A embraces two different isocyanate compounds A1 or one isocyanate compound A1 and at least one isocyanate compound A2 or component B embraces at least two different compounds B1. The present invention also provides the radiation-curable, urethane-functional prepolymers obtainable by the process of the invention.

In one embodiment of the process of the invention therefore component B comprises at least two different compounds B1 if component A contains no difunctional isocyanate compound A2.

In a further embodiment, component A comprises a mixture of at least two different isocyanate compounds A1a and A1b and, if desired, at least one isocyanate compound A2, but preferably no compound A2. The prepolymers thus obtainable are also accessible by mixing a prepolymer of an isocyanate compound A1a and component B with a prepolymer of an isocyanate A1b and component B. In this embodiment of the process, particularly storage-stable prepolymers are obtained.

Suitable trifunctional isocyanate compounds A1 include both compounds having a defined empirical formula, having 3 NCO groups per molecule, and low molecular mass oligomers having a number-average molecular weight Mn<1000, and containing on average about 3.0 isocyanate groups per oligomer molecule.

The compounds A1 are preferably selected from the biurets and cyanurates of diisocyanates and from the adducts of diisocyanates with trifunctional aliphatic alcohols. Suitable diisocyanates are generally of 4 to 22 carbons. The diisocyanates are normally selected from aliphatic, cycloaliphatic and aromatic diisocyanates, examples being 1,4-diisocyanatobutane, 1,6-diisocyanatohexane, 1,6-diisocyanato-2,2,4-trimethylhexane, 1,6-diisocyanato-2,4,4-trimethylhexane, 1,2-, 1,3- and 1,4-diisocyanatocyclohexane, 2,4- and 2,6-diisocyanato-1-methylcyclohexane, 4,4'-bis(isocyanatocyclohexyl)methane, isophoronediisocyanate (=1-isocyanato-3,3,5-trimethyl-5-isocyanatomethylcyclohexane), 2,4- and 2,6-tolylene diisocyanate, tetramethylene-p-xylylene diisocyanate (=1,4-bis(2-isocyanatoprop-2-yl)benzene), 4,4'-diisocyanatodiphenylmethane, preferably 1,6-diisocyanatohexane and isophorone diisocyanate, and mixtures thereof. Preferred compounds A1 embrace the cyanurates and biurets of aliphatic diisocyanates, especially the cyanurates. Particularly preferred compounds A1 are the isocyanurate and the biuret of isophorone diisocyanate and the isocyanurate and the biuret of 1,6-diisocyanatohexane. Examples of adducts of diisocyanates with trifunctional alcohols are the adducts of the abovementioned diisocyanates with glycerol, trimethylolethane and trimethylolpropane, examples being the adduct of tolylene diisocyanates with trimethylolpropane or the adducts of 1,6-diisocyanatohexane or isophorone diisocyanate with trimethylpropane and/or glycerol.

If component A comprises a mixture of two different isocyanate compounds A1a and A1b, this is preferably a mixture of a biuret and an isocyanurate of one of the abovementioned aliphatic diisocyanates, or a mixture of such a biuret or isocyanurate with an adduct of one of the abovementioned aliphatic diisocyanates with a trifunctional aliphatic alcohol. In this context, it is particularly preferred to use the same diisocyanate both for the biuret and for the isocyanate and the adduct. With very particular preference, use is made of a mixture of the biuret and the cyanurate of 1,6-diisocyanatohexane (hexamethylene diisocyanate) or isophorone diisocyanate.

Examples of suitable difunctional isocyanate compounds A2 are the abovementioned diisocyanates, preferably 2,4- and 2,6-tolylene diisocyanate, tetramethyl-p-xylylene diisocyanate, diphenylmethane 4,4'-diisocyanate and, in particular, isophorone diisocyanate.

The compounds B1 of component B are generally selected from the esters of ethylenically unsaturated carboxylic acids, such as acrylic, methacrylic, crotonic, acrylamidoglycolic, methacrylamidoglycolic and vinylacetic acid with a di- or polyol having preferably 2 to 20 carbons, such as ethylene glycol, diethylene glycol, triethylene glycol, 1,2-propylene glycol, 1,3-propylene glycol, diethylene glycol, triethylene glycol, dipropylene glycol, tripropylene glycol, 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, glycerol, trimethylolethane, trimethylolpropane, trimethylolbutane, pentaerythritol, ditrimethylolpropane, erythritol and sorbitol, provided the ester has at least one isocyanate-reactive OH group. It is also possible to employ as compound B1 the amides of the abovementioned ethylenically unsaturated carboxylic acids with amino alcohols, such as 2-aminoethanol, 3-amino-1-propanol, 1-amino-2-propanol or 2-(2-aminoethoxy)ethanol, and also the vinyl, allyl and methallyl ethers of the abovementioned di- or polyols, provided they still have a free OH group. Preferred compounds B1 are the esters of acrylic and methacrylic acid, such as 2-hydroxyethyl (meth)acrylate, hydroxypropyl (meth)acrylate, 1,4-butanediol mono(meth)acrylate, neopentyl glycol mono(meth)acrylate, trimethylolpropane mono- and di(meth)acrylate, pentaerythritol di- and tri(meth)acrylate. With particular preference B1 is selected from 2-hydroxyethyl acrylate, hydroxypropyl acrylate and 1,4-butanediol monoacrylate. Examples of amides of ethylenically unsaturated carboxylic acids with amino alcohols are 2-hydroxyethylacrylamide and -methacrylamide, 2- and 3-hydroxypropyl(meth)acrylamide and 5-hydroxy-3-oxopentyl(meth)acrylamide.

The compounds B2 which may be present in component B embrace the diols or polyols specified in connection with compound B1, their alkoxylation products, hydroxyl-containing polyesters, hydroxyl-containing polyethers and monofunctional alkanols having preferably 1 to 10 carbons and cycloalkanols having preferably 5 to 10 carbons.

Hydroxyl-containing polyesters can be prepared in conventional manner by esterifying dicarboxylic acids with diols or polyols. Preferred dicarboxylic acids are succinic, glutaric, adipic, sebacic and o-phthalic acid, their isomers and hydrogenation products, and the dialkyl esters of these acids that are amenable to transesterification reactions. Suitable diols, polyols are those specified above in connection with compound B1. The hydroxyl-containing polyesters also include the caprolactonediols and -triols, whose preparation is known to the skilled worker. Hydroxyl-containing polyethers embrace oligomers of ethylene oxide and/or of propylene oxide, and also alkoxylation products of the abovementioned diols or polyols, preferably ethoxylation and propoxylation products having a degree of alkoxylation of preferably 1 to 10.

Preferred compounds B2 are monofunctional alkanols having 1 to 10 carbons, preferably 1 to 5 carbons, such as methanol, ethanol, n-propanol, isopropanol, n-butanol, 2-butanol, isobutanol, tert-butanol, n-pentanol, 3-methyl-1-butanol, n-hexanol, n-octanol and 2-ethylhexanol, and also cylcoalkanols having 5 to 10 carbon atoms, such as cyclopentanol and cyclohexanol, and also cyclohexanols with methyls on the ring, and difunctional alkanols such as 1,4-butanediol, 1,5-pentanediol and 1,6-hexanediol.

In one preferred embodiment of the present invention the isocyanate-functional component A comprises at least one trifunctional isocyanate A1 and at least one difunctional isocyanate A2. In this case the molar ratio of difunctional isocyanate A2 to trifunctional isocyanate A1 (=A2:A1) is preferably in the range from 1:10 to 5:1, in particular from 1:5 to 2:1 and, with very particular preference, from 1:2 to 2:1. Preferred A1/A2 combinations include at least one cyanurate of the abovementioned aliphatic diisocyanates, especially the cyanurate of hexamethylene diisocyanate, as compound A1, and one aliphatic or cycloaliphatic diisocyanate, especially isophorone diisocyanate, as compound A2. In this embodiment, storage-stable, radiation-curable, urethane-functional prepolymers are obtained if component B comprises at least one ethylenically unsaturated compound B1.

In another preferred embodiment component A has only one trifunctional isocyanate A1. In this case, storage-stable, radiation-curable, urethane-functional prepolymers are obtained if the component B comprises at least two different ethylenically unsaturated compounds B1, in each case having at least one reactive OH group (compounds B1a and B1b). The molar ratio B1a:B1b is then preferably in the range from 1:10 to 10:1, in particular from 1:4 to 4:1 and, with particular preference, from 1:2 to 2:1. In this embodiment it is very particularly preferred if the component B comprises three different compounds B1, preferably each accounting for from 20 to 40 mol-% of the overall molar amount of B1. In this embodiment, of course, component A may include both a trifunctional isocyanate A1 and a difunctional isocyanate A2 as well.

If component A comprises at least two different isocyanates A1a and A1b, it is preferred not to use a difunctional isocyanate A2. In this case, the weight ratio of A1a to A1b is preferably in the range from 1:5 to 5:1, in particular in the range from 1:3 to 3:1 and, with very particular preference, is 1:1.

The process of the invention is generally conducted in a manner which ensures that the urethane-functional prepolymers obtainable thereby no longer have any isocyanate groups. This is usually achieved by reacting the NCO groups of component A with an at least equimolar amount of OH groups of component B to a degree of conversion of from 33 to 98%, at least 0.3 mol of OH groups per mole of isocyanate groups being contributed by compounds B1. The unconverted isocyanate groups can then be neutralized by reaction with at least one compound B2. Some of the OH groups of component B can be replaced by primary or secondary amino groups. In this case, the isocyanate groups form urea groups. Particular stability on storage is possessed, however, by polymers of the invention that are essentially free from urea groups. In this case the proportions in component A and component B are chosen so that the ratio of NCO to OH groups is at least approximately equimolar.

In one preferred embodiment, the molar ratio of the OH groups of compounds B1 to the isocyanate groups of component A ($=OH_{B1}:NCO_A$) is in the range from 0.3:1 to 1:1, in particular from 0.5:1 to 0.99:1 and, with very particular preference, from 0.6:1 to 0.99:1, the remaining NCO groups being reacted with compounds B2. In this embodiment of the invention, the molar ratio of the OH groups of component B to the NCO groups of component A ($=OH_B:NCO_A$) is preferably $\geq 1$. In this embodiment, preferably, the compounds B1 are first reacted with component A, and then the compounds B2.

The reaction of component A with component B takes place in a manner that is known for the reaction of NCO with OH groups. It is normally conducted at from 0 to 100° C. and, in particular, at from 20 to 70° C. Preferably, component A is introduced as initial charge in the reaction mixture and component B is added under reaction conditions. The duration of this addition is preferably in the range from 10 minutes to 2 hours. The components are then generally left for a certain time, preferably from 0.5 h to 5 h, to continue reacting under reaction conditions. Where component B comprises at least one ethylenically unsaturated compound B1 and at least one different compound B2, these compounds can be added to the reaction mixture simultaneously or in succession. Where compound B2 is a monofunctional compound of low molecular mass, it is preferably not added to the reaction mixture until the compound B1 has already reacted. If, on the other hand, compound B2 is a compound of relatively high molecular mass, such as hydroxyl-containing polyester or a hydroxyl-containing polyether, then this compound is preferably introduced as initial charge in the reaction mixture together with component A.

To accelerate the reaction it is possible to employ catalysts as are described, for example, in Houben-Weyl, Methoden der Organischen Chemie, Vol. XIV/2, Thieme-Verlag, Stuttgart 1963, p. 60f. and in Ullmanns Enzyklopadie der Technischen Chemie, 4th ed., Vol. 19 (1981), p. 306. Tin-containing catalysts are preferred, such as dibutyltin dilaurate, tin(II) octoate or dibutyltin dimethoxide. Such catalysts are generally employed in an amount of from 0.001 to 2.5% by weight, preferably from 0.005 to 1.5% by weight, based on the overall amount of components A and B.

To stabilize the free-radically polymerizable compounds (compounds B1) it is preferred to add to the reaction from 0.001 to 2% by weight, in particular from 0.005 to 1.0% by weight, of polymerization inhibitors. These are the usual compounds suitable for hindering free-radical polymerization, examples being hydroquinones or hydroquinone monoalkyl ethers, 2,6-di-tert-butylphenols, such as 2,6-di-tert-butylcresol, nitrosamines, phenothiazines or phosphorous esters.

The reaction can be carried out either without solvent or with the addition of solvents. Suitable solvents are inert ones such as acetone, methyl ethyl ketone, tetrahydrofuran, dichloromethane, toluene, $C_1-C_4$-alkyl esters of acetic acid, such as ethyl acetate or butyl acetate. The reaction is preferably carried out without solvent.

In one preferred embodiment of the present invention, in which the ethylenically unsaturated compound B1 that is employed is a hydroxyl-containing ester of an $\alpha,\beta$-ethylenically unsaturated carboxylic acid, such as an ester of acrylic or methacrylic acid, it is possible following the reaction of component A with component B to add a primary or secondary amine to the reaction mixture. The amine is preferably not added until the degree of conversion has reached>98%, in particular>99% and, with very particular preference>99.5%, based on the isocyanate groups employed. This procedure prevents the formation of urea groups. The primary and/or secondary amines react with the $\alpha,\beta$-ethylenically unsaturated double bonds in a Michael reaction to form secondary and/or tertiary amine structures, respectively.

In this embodiment of the invention, insofar as a difunctional isocyanate A2 and a trifunctional isocyanate A1 are employed, the molar ratio A2:A1 is preferably in the range from 1:10 to 1:2 and in particular from 1:5 to 1:1.

Suitable compounds having primary or secondary amino groups are, in general, of low molecular mass and preferably have a molar weight<1000. Such compounds preferably contain one or two amino groups. Examples of suitable amines include primary monoamines, examples being $C_1-C_{20}$-alkylamines such as n-butylamine, n-hexylamine, 2-ethylhexyl-1-amine, 1-octadecylamine, amines having cycloaliphatic, heterocyclic or (hetero)aromatic structural elements, such as benzylamine, 1-(3-aminopropyl) imidazole and tetrahydrofurfurylamine. Mention is also made of compounds having two primary amino groups, examples being $C_1-C_{20}$-alkylenediamines such as ethylenediamine, butylenediamine, 1,5-diamino-3-oxopentane, etc. Preference is given to secondary amines, examples being di-$C_1-C_{20}$-alkylamines, such as diethylamine, di-n-propylamine, di-n-butylamine, diethanolamine, dicyclohexylamine, bis-2-ethylhexylamine, diallylamine and N-ethylethanolamine. Preference is likewise given to heterocyclic secondary amines in which the NH group is on the heterocycle, such as pyrrolidine, piperidine, piperazine, N-methylpiperazine, morpholine and 2,2,6,6-tetramethylpiperidine.

The amount of amine employed is chosen so that the overall amount of amino groups of the amine makes up from 5 to 60 mol-%, based on the overall number of ethylenically unsaturated double bonds of the compound B1. The amino compounds are preferably added at from 10 to 100° C.

Where the reaction of components A with component B is to be followed by the addition of amines, component B is preferably such that at least 90 mol-% of the OH groups it contains originate from compounds B1. With particular preference, in this embodiment component B contains no compounds B2.

The number-average molecular weight Mn of the prepolymers obtainable in accordance with the invention is preferably $\leq 2000$ and in particular is from 400 to 1500. The prepolymers of the invention preferably have at least 1.5 mol of double bonds per kg of resin and, in particular, from 2 to 6 mol of double bonds per kg of resin.

The radiation-curable, urethane-functional prepolymers, referred to below as prepolymers PU, which are obtainable by the process of the invention can be employed alone or together with low molecular mass compounds having at least one ethylenically unsaturated, polymerizable double bond (component S; reactive diluents). Normally, the radiation-curable formulations based on the prepolymers PU include customary auxiliaries, such as thickeners, leveling assistants, fillers and/or pigments and, where necessary, photoinitiators and stabilizers. The prepolymers of the invention can also be employed together with other radiation-curable polymers or oligomers.

Where the prepolymers PU of the invention are employed in radiation-curable formulations for coating substrates, they normally include a reactive diluent. Such radiation-curable formulations comprise preferably from 20 to 90% by weight, in particular from 30 to 80% by weight, and, with particular preference, from 40 to 70% by weight of at least one prepolymer PU of the invention and from 10 to 80% by weight, in particular from 20 to is 70% by weight and, with particular preference, from 30 to 60% by weight of at least one reactive diluent (component S), the amounts by weight of components PU and S adding up to 100%.

Examples of suitable reactive diluents are vinyl-containing monomers, especially N-vinyl compounds, such as N-vinylpyrrolidone, N-vinylcaprolactam and N-vinylformamide, and also vinyl ethers, such as ethyl, propyl, isopropyl, butyl, isobutyl, tert-butyl, amyl, 2-ethylhexyl, dodecyl, octadecyl and cyclohexyl vinyl ether, ethylene glycol mono- and -divinyl ether, di-, tri- and tetraethylene glycol mono- and -divinyl ether, polyethylene glycol divinyl ether, ethylene glycol butyl vinyl ether, triethylene glycol methyl vinyl ether, polyethylene glycol methyl vinyl ether, cyclohexanedimethanol mono- and divinyl ether, trimethylolpropane trivinyl ether, aminopropyl vinyl ether, diethylaminoethyl vinyl ether and polytetrahydrofuran divinyl ether, vinyl esters, such as vinyl acetate, propionate, stearate and laurate, and vinylaromatic compounds, such as vinyltoluene, styrene, 2- and 4-butylstyrene and 4-decylstyrene, and also acrylate- and methacrylate-functional monomers, examples being hydroxyethyl (meth)acrylate, tripropylene glycol methyl ether (meth)acrylate, cyclohexyl (meth)acrylate, 4-tert-butylcyclohexyl (meth)acrylate, trimethylolpropane monoformal acrylate, glycerol monoformal acrylate, 4-tetrahydropyranyl acrylate, 2-tetrahydropyranylmethyl acrylate and tetrahydrofurfuryl acrylate.

Preferred reactive diluents are di- or polyfunctional esters of α,β-ethylenically unsaturated carboxylic acids with aliphatic di- or polyols. Examples of suitable di- or polyol components are the abovementioned diols or polyols specified in connection with compound B1. Unlike the compounds B1, however, the reactive diluents preferably no longer have any free OH groups. Examples of such reactive diluents are ethylene glycol di(meth)acrylate, propylene glycol di(meth)acrylate, butylene glycol di(meth)acrylate, 1,6-hexanediol di(meth)acrylate, diethylene glycol di(meth)acrylate, triethylene glycol di(meth)acrylate, dipropylene glycol di(meth)acrylate, tripropylene glycol di(meth)acrylate, 1,4-cyclohexanediol di(meth)acrylate and 1,4-bis(hydroxymethyl)cyclohexane di(meth)acrylate, and also trimethylolethane tri(meth)acrylate, trimethylolpropane tri(meth)acrylate and pentaerythritol tetra(meth)acrylate. Preference is also give to the esters of ethoxylated polyols, for example the triacrylate or trimethacrylate of ethoxylated trimethylolpropane.

Depending on their intended use, the radiation-curable formulations of the invention may also include up to 20% by weight, based on the overall weight of the formulation, of customary auxiliaries, such as thickeners, leveling assistants, defoamers, UV stabilizers, lubricants and fillers. Suitable auxiliaries are generally well known to the skilled worker from the technology of paints and coatings. Suitable fillers include silicates, for examples silicates obtainable by hydrolysis of silicon tetrachloride, such as Ärosil® from Degussa, silica, talc, aluminum silicates, magnesium silicates, calcium carbonates, etc. Suitable stabilizers include typical UV absorbers, such oxanilides, triazines and benzotriazole (the latter obtainable as Tinuvin® grades from Ciba-Spezialitatenchemie) and benzophenones. These can be used alone or together with suitable free-radical scavengers, examples being sterically hindered amines, such as 2,2,6,6-tetramethylpiperidine, 2,6-di-tert-butylpiperidine or derivatives thereof, such as bis(2,2,6,6-tetramethyl-4-piperidyl) sebacate. Stabilizers are normally employed in amounts of from 0.1 to 5.0% by weight, based on the components PU and S present in the formulation.

Insofar as full curing takes place by means of UV radiation, the formulations of the invention comprise at least one photoinitiator which is able to initiate the polymerization of ethylenically unsaturated double bonds. Such photoinitiators include benzophenone and benzophenone derivatives, such as 4-phenylbenzophenone and 4-chlorobenzophenone, Michler's ketone, anthrone, acetophenone derivatives, such as 1-benzoylcyclohexan-1-ol, 2-hydroxy-2,2-dimethylacetophenone and 2,2-dimethoxy-2-phenylacetophenone, benzoin and benzoin ethers, such as methyl, ethyl and butylbenzoin ether, benzil ketals, such as benzil dimethyl ketal, 2-methyl-1-[4-(methylthio)phenyl]-2-morpholinopropan-1-one, anthraquinone and its derivatives, such as β-methylanthraquinone and tert-butylanthraquinone, acylphosphine oxides, such as 2,4,6-trimethylbenzoyldiphenyl-phosphine oxide, ethyl 2,4,6-trimethylbenzoylphenylphosphinate and bisacylphosphine oxides. These photoinitiators are, where necessary, employed in amounts of from 0.05 to 20% by weight, preferably from 0.1 to 10% by weight and, in particular, from 0.2 to 5% by weight, based on the polymerizable components A, B and C of the formulations of the invention. If the formulation of the invention is cured by means of electron beams, the use of photoinitiators can be omitted. When electron beam curing is employed, the formulations of the invention may additionally contain colored pigments.

Preferably, the formulations of the invention contain no pigments or fillers. In addition, the formulations of the invention are preferably free from inert, nonpolymerizable solvents.

The radiation-curable, urethane-functional prepolymers of the invention and their formulation are notable for very good stability on storage, especially at temperatures below 10° C. This good stability on storage is manifested, for example, by the low propensity to crystallization, geling or thixotropy. The formulations based on the urethane-functional prepolymers of the invention, moreover, feature a comparatively low viscosity<10 Pas (determined at 23° C. by means of a ICI cone-plate viscometer). It is noteworthy here that the positive properties are not gained at the expense of the mechanical properties of coatings based on the prepolymers of the invention. For instance, such coatings are generally of high hardness, characterized by values for the pendulum attenuation (in accordance with DIN 53157) of>50 sec. In many cases the coatings additionally exhibit high flexibility, characterized by values for the Erichsen indentation (in accordance with DIN 53156) of>3 mm.

The formulations of the invention are found to be particularly appropriate for the coating of substrates such as wood, paper, plastic surfaces, mineral construction materials, such as special-purpose cement blocks and cement fiber slabs, and especially for metals or coated metals.

Accordingly, the present invention also provides a method of coating substrates, especially metals or coated metals, and the coated substrates obtainable by this method. The substrates are generally coated by applying at least one radiation-curable formulation of the invention to the substrate that is to be coated, removing any solvent and then curing the coating by the action of high-energy radiation, such as UV radiation or electron beams. This operation may, if desired, be repeated one or more times. The radiation-curable formulations are applied to the substrate conventionally, for example by spraying, brushing, rolling or flow-coating or by coating with a filler knife or doctor blade. The coating add-on is generally in the range from 3 to 500 g/m$^2$ and preferably from 10 to 200 g/m$^2$, corresponding to wet-film thicknesses of from about 3 to 500 μm, preferably from 10 to 200 μm. Application can be made either at room temperature or above, but preferably not above 100° C. The coatings are subsequently cured through the action of high-energy radiation, preferably UV radiation with a wavelength of from 250 to 400 nm, or by irradiation with high-energy electrons (electron beams; from 150 to 300 keV). Examples of UV sources used are high-pressure mercury vapor lamps, examples being the CK or CK1 lamps from IST. When using UV curing, the radiation dose which is usually sufficient for crosslinking is within the range from 80 to 3000 mJ/cm$^2$.

In one preferred procedure curing takes place continuously by passing the substrate that has been treated with the formulation of the invention in front of a radiation source at a constant speed. This requires the curing rate of the formulation of the invention to be sufficiently high.

In the text below the present invention is explained with reference to some examples.

I) Determining the performance properties of pendulum attenuation, Erichsen indentation, viscosity, reactivity, and stability on storage The pendulum attenuation was determined in accordance with DIN 53157. To this end the radiation-curable prepolymers or radiation-curable compositions were applied with a wet-film thickness of 100 µm to glass. The resulting sample was cured fully by being passed in front of a high-pressure mercury vapor lamp (80 W/cm) at a belt speed of 50 m/min and at a distance of 10 cm.

The Erichsen indentation was determined in accordance with DIN 53156. To this end, a spiral-wound coating bar was used to apply the respective formulation of the invention in a wet-film thickness of 50 µm to a BONDER 132 metal panel. Full curing was carried out in the manner described above by exposure with a high-pressure mercury vapor lamp. The Erichsen indentation was then measured by pressing a metal ball into the uncoated side of the panel.

The viscosity was determined at 23° C. using an ICI cone-plate viscometer.

Determining the storage stability

To investigate the storage stability, samples of the prepolymers of the invention or their radiation-curable formulations but still without auxiliaries were stored in cells with a path length of 1 cm, at 0° C. and 8° C. respectively, and the clouding of the samples was monitored. The storage stability quoted is the day on which the sample showed first signs of clouding.

II.) Preparing the prepolymers of the invention, Examples 1 to 8, Comparative Examples 1 to 5

EXAMPLE 1

203.7 parts by weight of the isocyanurate of hexamethylene diisocyanate and 29.95 parts of isophorone diisocyanate, together with 0.46 part by weight of 2,6-bis-tert-butyl-p-cresol and 0.23 part by weight of hydroquinone monomethyl ether, were heated to 60° C. 0.1 part by weight of dibutyltin dilaurate was added, and 151.4 parts by weight of hydroxyethyl acrylate were added dropwise with stirring and cooling over the course of 20 minutes at a rate such that the temperature did not rise above 75° C. Reaction was continued at 70–75° C. for about 4 hours until isocyanate content* of the mixture was 0.28%. This mixture was cooled to 55° C., and then 77.5 parts by weight of di-n-butylamine were added over the course of 15 minutes with cooling. Reaction was then allowed to continue at 70–75° C. for a further 2.5 hours, after which 463.3 parts by weight of the triacrylate of ethoxylated trimethylolpropane (degree of ethoxylation 3.0) were added and the temperature was held at 70–75° C. for 2 hours more. The mixture was then filtered over a filter having a mesh size of 80 µm. The viscosity of the resulting formulation was 6.2 Pas. A sample stored at 0° C. was still completely clear after 100 days.

The isocyanate content was determined by reacting a defined amount of the reaction mixture with excess n-butylamine and back-titrating the excess with 0.1 N hydrochloric acid.

EXAMPLE 2

Prepared as in Example 1 but using, instead of 77.5 parts of di-n-butylamine, 34.9 parts by weight of morpholine. The viscosity of the formulation was 5.2 Pas. A sample of the formulation was still completely clear after 100 days at 0° C.

Comparative Example 1

252.7 parts by weight of the isocyanurate of hexamethylene diisocyanate, together with 0.1 part by weight of dibutyltin dilaurate, 0.46 part by weight of 2,6-bis-tert-butyl-p-cresol and 0.23 part by weight of hydroquinone monomethyl ether, were heated to 60° C. with stirring. 151.4 parts by weight of hydroxyethyl acrylate were added dropwise over the course of 20 minutes, in the course of which the temperature rose to 70° C. This temperature was maintained for 4 hours more. Subsequently, the isocyanate content was 0.08 mol-%. Then 77.5 parts by weight of di-n-butylamine were added over the course of 15 minutes, during which the temperature rose to 73° C. This temperature was maintained for 2.5 hours and then 463.3 parts by weight of the triacrylate of ethoxylated trimethylolpropane (degree of ethoxylation 3.0) were added. Filtration was subsequently carried out as described in Example 1. The resulting formulation had a viscosity of 4.96 Pas.

A sample of this formulation stored at 0° C. showed slight signs of clouding after just 8 days, and after 13 days was opaque.

EXAMPLE 3

282.9 parts by weight of the isocyanurate of hexamethylene diisocyanate and 166.7 parts of isophorone diisocyanate, together with 0.75 part by weight of 2,6-bis-tert-butyl-p-cresol and 0.37 part by weight of hydroquinone monomethyl ether, were heated to 60° C. 0.15 part by weight of dibutyltin dilaurate was added, and 295.8 parts by weight of hydroxyethyl acrylate were added dropwise with stirring and cooling over the course of 20 minutes at a rate such that the temperature did not rise above 75° C. Reaction was continued at 70–75° C. for about 4 hours until isocyanate content of the mixture was 2.29 mol-%. Then 15.1 parts by weight of methanol were added and reaction was allowed to continue at 70–75° C. for 2.5 hours more. Subsequently, 320 parts by weight of hexanediol diacrylate were added and the temperature of 70–75° C. was maintained for 2 hours more. The mixture was then filtered over a filter having a mesh size of 80 µm. The viscosity of the resulting formulation was 3.5 Pas. A sample stored at 8° C. was still completely clear after 105 days.

EXAMPLE 4

Prepared as in Example 3 except that the amounts of isocyanate employed were 396.1 parts by weight of the isocyanurate of hexamethylene diisocyanate and 100 parts by weight of isophorone diisocyanate. The viscosity of the formulation was 3.9 Pas. A sample stored at 8° C. showed clouding after 14 days.

Comparative Example 2

Preparation was as in Example 3 but the isocyanate component employed comprised exclusively 814 parts by weight of the isocyanurate of hexamethylene diisocyanate, and 418 parts by weight of 2-hydroxyethyl acrylate and 541 parts by weight of hexanediol diacrylate were used. The resulting sample had a viscosity of 4.0 Pas. A sample stored at 8C had geled after only 2 days, and after 3 days was cloudy.

Comparative Example 3

222.3 parts by weight of isophorone diisocyanate, 0.46 part by weight of 2,6-bis-tert-butyl-p-cresol and 0.23 part by weight of hydroquinone monomethyl ether were heated together to 60° C. Then 0.1 part by weight of dibutyltin dilaurate was added, and 232.3 parts by weight of hydroxyethyl acrylate were added dropwise with stirring and cooling over the course of 30 minutes at a rate such that the temperature did not exceed 75° C. The temperature of 70–75° C. was maintained for 5 hours. Subsequently, the isocyanate content was 0.13 mol-%. Then 0.5 part by weight of methanol was added and reaction was continued at 70–75° C. for three hours more. 195 parts by weight of hexanediol diacrylate were subsequently added and the temperature of 70–75° C. was maintained for a further 3 hours. The mixture was then filtered over a filter with a mesh size of 80 µm. The resulting product had a viscosity of 1.6 Pas. A sample stored at 8° C. was completely cloudy after 4 days.

EXAMPLE 5

200 parts by weight of isocyanurate of hexamethylene diisocyanate, 0.31 part by weight of 2,6-bis-tert.-butyl-p-cresol and 0.16 part by weight of hydroquinone monomethyl ether were heated to 50° C. 0.06 part by weight of dibutyltin dilaurate was added, and a mixture of 33 parts by weight of hydroxyethyl acrylate, 33 parts by weight of hydroxypropyl acrylate and 33 parts by weight of hydroxybutyl acrylate was added dropwise with stirring and cooling over the course of 20 minutes in a manner such that the temperature did not rise above 75° C. Reaction was continued at 70–75° C. for 4 hours. The isocyanate content was then 3.7 mol-%. The mixture was subsequently cooled to 55° C., 10 parts by weight of methanol were added with cooling over the course of 15 minutes, and reaction was continued at 60° C. for 1 hour more. Then 133 parts by weight of hexanediol diacrylate were added and the temperature of 60° C. was maintained for a further hour. Filtration over a filter with a mesh size of 80 µm gave a product having a viscosity of 3 Pas.

A sample stored at 0° C. was still completely clear after 100 days.

To determine the coating quality of the formulations of the invention, 100 parts by weight of each of the formulations from Examples 1 to 5 and from the Comparative Examples 1 to 3 were blended with 3 parts of 2-hydroxy-2-methyl-1-phenylpropan-1-one (Darocure® 1173 from Ciba-Spezialitatenchemie). The pendulum attenuation and Erichsen indentation were determined in the manner described above for the resulting formulations. The results are set out in Table 1 together with the values for storage stability.

TABLE 1

| Example | Storage stability (d) | Pendulum attenuation (sec) | Erichsen indentation (mm) |
| --- | --- | --- | --- |
| 1 | >100 | 56 | 6.3 |
| C1 | 8 | 59 | 7.1 |
| 2 | >100 | 120 | 4.8 |
| 3 | >105 | 185 | 3.5 |
| 4 | 14 | 181 | 3.6 |
| C2 | 3 | 175 | 3.0 |
| C3 | 4 | 188 | 3.6 |
| 5 | >100 | 150 | 1.8 |

Comparative Example 4

1500 parts of the isocyanurate of hexamethylene diisocyanate, 2.26 parts of 2,6-di-tert-butyl-p-cresol and 1.13 parts of hydroquinone monomethyl ether are heated to 60° C., 0.24 part of dibutyltin dilaurate is added, and 683 parts of hydroxyethyl acrylate are added dropwise over 20 minutes with stirring and cooling such that the temperature does not exceed 75° C. After 4 hours of reaction at from 70 to 75° C. the isocyanate content was 2.4%. The reaction product is cooled to 55° C. whereupon 75 parts of methanol are added over the course of 15 minutes with thorough cooling, and the mixture is allowed to react for a further 2.5 hours at from 70 to 75° C. Then 973 parts of hexanediol diacrylate are added and the mixture is allowed to react for a further 2 hours at from 70 to 75° C. Filtration over an 80 µm filter gives a product having a viscosity of 3.4 Pas.

The product is stored in a refrigerator at a temperature of 0° C., and the clouding of the sample is monitored. After 10 days, the sample has started to gel, and after 14 days it is cloudy and solid.

Comparative Example 5

1970 parts of the biuret of hexamethylene diisocyanate, 3 parts of 2,6-di-tert-butyl-p-cresol and 1.5 parts of hydroquinone monomethyl ether are heated to 60° C., 0.6 part of dibutyltin laurate is added, and 894.5 parts of hydroxyethyl acrylate are added dropwise over 20 minutes with stirring and cooling such that the temperature does not exceed 75° C. After 4 hours of reaction at from 70 to 75° C. the isocyanate content was 3.8%. The reaction product is cooled to 55° C. whereupon 98.7 parts of methanol are added over the course of 15 minutes with thorough cooling, and the mixture is allowed to react for a further 2.5 hours at from 70 to 75° C. Then 1276 parts of hexanediol diacrylate are added and the mixture is allowed to react for a further 2 hours at from 70 to 75° C. Filtration over an 80 µm filter gives a product having a viscosity of 3.5 Pas.

The product is stored in a refrigerator at a temperature of 0° C., and the clouding of the sample is monitored. After 4 days, the sample becomes cloudy but remains fluid.

EXAMPLE 6

A clear mixture is prepared from 10 parts of Comparative Example 4 and 10 parts of Comparative Example 5.

This mixture is stored in a refrigerator at a temperature of 0° C. and the clouding of the sample is monitored. After 130 days the sample is still clear and fluid, while the samples of Comparative Examples 4 and 5 have become cloudy.

EXAMPLE 7

267 parts of the isocyanurate of hexamethylene diisocyanate, 533 parts of the biuret of hexamethylene diisocyanate, 2.26 parts of 2,6-di-tert-butyl-p-cresol and 1.13 parts of hydroquinone monomethyl ether are heated to 60° C., 0.24 part of dibutyltin laurate is added, and 683 parts of hydroxyethyl acrylate are added dropwise over 20 minutes with stirring and cooling such that the temperature does not exceed 75° C. After 4 hours of reaction at from 70 to 75° C. the isocyanate content was 2.4%. The reaction product is cooled to 55° C. whereupon 75 parts of methanol are added over the course of 15 minutes with thorough cooling, and the mixture is allowed to react for a further 2.5 hours at from 70 to 75° C. Then 973 parts of hexanediol diacrylate are added and the mixture is allowed to react for a further 2 hours at from 70 to 75° C. Filtration over an 80 $\mu$m filter gives a product having a viscosity of 3.4 Pas.

The product is stored in a refrigerator at a temperature of 0° C. and the clouding of the sample is monitored. After 130 days, the sample is still fluid and has only a slight haze.

EXAMPLE 8

50 parts of the isocyanurate of hexamethylene diisocyanate, 50 parts of the biuret of hexamethylene diisocyanate, 0.14 part of 2,6-di-tert-butyl-p-cresol and 0.07 part of hydroquinone monomethyl ether are heated to 60° C., 0.1 part of dibutyltin laurate is added, and 49.5 parts of hydroxyethyl acrylate are added dropwise over 20 minutes with stirring and cooling such that the temperature does not exceed 75° C. After 4 hours of reaction at from 70 to 75° C. the isocyanate content was 1.7%. The reaction product is cooled to 55° C. whereupon 7 parts of methanol are added over the course of 15 minutes with thorough cooling, and the mixture is allowed to react for a further 2.5 hours at from 70 to 75° C. Then 62 parts of hexanediol diacrylate are added and the mixture is allowed to react for a further 2 hours at from 70 to 75° C. Filtration over an 80 $\mu$m filter gives a product having a viscosity of 3.6 Pas.

The product is stored in a refrigerator at a temperature of 0° C., and the clouding of the sample is monitored. After 130 days, the sample is still clear and fluid.

EXAMPLE 9

20 parts of hydroxyethyl acrylate, 28.6 parts of hexanediol diacrylate, 0.68 part of hexanediol, 0.07 part of 2,6-di-tert-butyl-p-cresol, 0.03 part of hydroquinone monomethyl ether and 0.01 part of dibutyltin dilaurate are charged to a reaction flask and then 22 parts of the isocyanurate of hexamethylene diisocyanate and 22 parts of the biuret of hexamethylene diisocyanate are added dropwise over the course of 75 minutes with stirring and cooling such that the temperature does not exceed 75° C. After 4 hours of reaction at from 70 to 75° C. the isocyanate content was 1.6%. The reaction product is cooled to 60° C. and then 1.8 parts of methanol are added over the course of 15 minutes with thorough cooling and the reaction mixture is left to react for a further 2.5 hours at from 70 to 75° C. Then 62 parts of hexanediol diacrylate are added and the mixture is left to react for a further 2 hours at from 70 to 75° C. Filtration over an 80 $\mu$m filter gives a product having a viscosity of 5.1 Pas.

The product is stored in a refrigerator at a temperature of 0° C. and the clouding of the sample is monitored. After 150 days the sample is still clear and fluid.

We claim:

1. A process for preparing radiation-curable, urethane-functional prepolymers PU, the process comprising
   reacting an isocyanate-functional component A with an OH-containing component B, wherein
   the component A comprises at least one trifunctional isocyanate compound A1 with or without one or more difunctional isocyanate compounds A2;
   the OH-containing component B comprises at least one ethylenically unsaturated compound B1 having at least one reactive OH group with or without different OH-containing compounds B2; and
   either component A1 embraces at least two different isocyanate compounds A1a and A1b in a weight ratio of 1:3 to 3:1 or component A embraces one isocyanate compound A1 and at least one isocyanate compound A2 in a molar ratio of 10:1 to 1:5,
   wherein the compound A1 is selected from the group consisting of cyanurate of hexamethylene diisocyanate, cyanurate of isophorone diisocyanate biuret of hexamethylene diisocyanate, and biuret of isophorone diisocvanate.

2. A process as claimed in claim 1, wherein the compound B1 is an ester of acrylic or methacrylic acid with an aliphatic di- or polyol, the ester still having at least one free OH group.

3. A process as claimed in claim 2, wherein the compound B1 is selected from 2-hydroxyethyl (meth)acrylate, hydroxypropyl (meth)acrylate, 1,4-butanediol (meth)acrylate, trimethylolpropane mono- and di(meth)acrylate and pentaerythritol tri(meth)acrylate.

4. A process as claimed in claim 2, wherein the component B comprises at least two different compounds B1a and B1b with a molar ratio B1a:B1b in the range from 1:10 to 10:1.

5. A radiation-curable, urethane-functional prepolymer PU produced by a process as claimed in claim 1.

6. A radiation-curable formulation comprising at least one prepolymer PU as claimed in claim 5.

7. A radiation-curable formulation as claimed in claim 6, comprising
   i) from 20 to 90% by weight of said at least one prepolymer PU,
   ii) from 10 to 80% by weight of at least one low molecular mass compound containing at least one ethylenically unsaturated, polymerizable double bond (component S), and
   iii) of up to 20% by weight, based on the overall weight of components PU and S, of auxiliaries, with the proviso that the amounts by weight of component PU and S add up to 100% by weight.

8. A method of coating a substrate, which comprises applying a prepolymer PU as claimed in claim 5 to the substrate which is to be coated, removing any solvent and then carrying out curing by irradiation with UV or electron beams.

9. A coated substrate produced by a method as claimed in claim 8.

10. A process as claimed in claim 1, wherein A1a is selected from the group consisting of cyanurate of hexamethylene diisocyanate and cyanurate of isophorone diisocyanate, and A1b is selected from the group consisting of biuret of hexamethylene diisocyanate and biuret of isophorone diisocyanate.

11. A method of coating a substrate, which comprises applying a radiation-curable formulation as claimed in claim 6 or 7 to the substrate which is to be coated, removing any solvent and then carrying out curing by irradiation with UV or electron beams.

* * * * *